ns011087118B2

United States Patent
Beaudet et al.

(10) Patent No.: US 11,087,118 B2
(45) Date of Patent: Aug. 10, 2021

(54) FACIAL RECOGNITION METHOD

(71) Applicant: IDEMIA IDENTITY & SECURITY FRANCE, Courbevoie (FR)

(72) Inventors: Jean Beaudet, Courbevoie (FR); Baptiste Chu, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 125 days.

(21) Appl. No.: 16/697,908

(22) Filed: Nov. 27, 2019

(65) Prior Publication Data
US 2020/0184197 A1    Jun. 11, 2020

(30) Foreign Application Priority Data

Dec. 6, 2018    (FR) ..................... 1872407

(51) Int. Cl.
*G06K 9/00*    (2006.01)
*G06K 9/03*    (2006.01)
(Continued)

(52) U.S. Cl.
CPC ..... *G06K 9/00255* (2013.01); *G06K 9/00268* (2013.01); *G06K 9/00288* (2013.01);
(Continued)

(58) Field of Classification Search
CPC .......... G06K 9/00255; G06K 9/00268; G06K 9/00288; G06K 9/036; G06K 9/2027; G06K 9/40; H04N 5/2351; H04N 5/2354; G06T 2207/30201; G06T 2207/30168; G06T 2207/10152; G06T 7/0002
(Continued)

(56) References Cited

U.S. PATENT DOCUMENTS 9,986,151 B1    5/2018   Poon et al.
2010/0246904 A1*    9/2010   Yamashita ......... G06K 9/00255
                                                                382/118
(Continued)

FOREIGN PATENT DOCUMENTS

CN    106210471 A  * 12/2016
EP    1814082 A2     8/2007

OTHER PUBLICATIONS

Aug. 21, 2019 Search Report issued in French Patent Application No. 1872407.

*Primary Examiner* — Nancy Bitar
*Assistant Examiner* — Daniella M. Di Guglielmo
(74) *Attorney, Agent, or Firm* — Oliff PLC; R. Brian Drozd

(57) ABSTRACT

A facial recognition method is disclosed that is executed by a system comprising an image capture device and a light source able to illuminate a face positioned in front of the device. A plurality of images of a face is acquired, the light source producing a different illumination of the face at each image acquisition, and values representing the face from the plurality of images are extracted. To this aim, a first image of a face is acquired. An SNR value, referred to as the estimated value, of the first image is estimated from a reference SNR value, from image acquisition parameters and from values representing distances between the face and said device. Finally, the estimated value is used in order to determine whether or not the recognition procedure should be executed.

10 Claims, 3 Drawing Sheets

(51) Int. Cl.
*G06K 9/20* (2006.01)
*H04N 5/235* (2006.01)
*G06T 7/00* (2017.01)
*G06K 9/40* (2006.01)

(52) U.S. Cl.
CPC ........... *G06K 9/036* (2013.01); *G06K 9/2027* (2013.01); *G06K 9/40* (2013.01); *G06T 7/0002* (2013.01); *H04N 5/2351* (2013.01); *H04N 5/2354* (2013.01); *G06T 2207/10152* (2013.01); *G06T 2207/30168* (2013.01); *G06T 2207/30201* (2013.01)

(58) Field of Classification Search
USPC ........................................................ 382/118
See application file for complete search history.

(56) References Cited

U.S. PATENT DOCUMENTS

| | | | | |
|---|---|---|---|---|
| 2011/0304746 | A1* | 12/2011 | Iijima | G03B 7/28 348/229.1 |
| 2014/0112550 | A1* | 4/2014 | Hanna | G06K 9/00892 382/117 |
| 2015/0339515 | A1* | 11/2015 | Tomita | G06K 9/00255 382/118 |

* cited by examiner

FACIAL RECOGNITION METHOD

TECHNICAL FIELD

The invention relates to an automatic face recognition method as well as a system implementing said method.

PRIOR ART

Faced with a resurgence in data theft, attempts at fraud and pirating of computer data, data protection and access control have become major challenges. Techniques based on a use of biometric data are renowned for their high level of reliability. Automatic face recognition, also referred to as facial recognition, forms part of the techniques using biometric data. This technique comprises an acquisition of at least one image of a user, an extraction of biometric data from each image acquired, and then a comparison of the biometric data extracted with biometric data of known individuals.

Some terminals, such as smartphones, are equipped with a facial recognition system. These facial recognition systems generally use an image sensor in the terminal in order to acquire images of a user to be identified or authenticated. In the case of identification, this image of the user (or at least information representing this image) is compared with a set of reference images (or information representing reference images) contained in a database. In the case of authentication, this image (or at least information representing this image) is compared with a single reference image (or with information representing the reference image). The comparison makes it possible to determine whether or not the image of the user captured belongs to a person referenced in the database or whether the person is indeed the one that he claims to be. Facial recognition methods are known, such as the method described in the patent application FR 3059450, consisting of acquiring a sequence of images representing a face, the face undergoing variations in illumination during the acquisition of the images according to a known illumination sequence. Knowing thus the variations in illumination, it is possible to determine variations in biometric characteristics that are normally caused on the user. During an authentication or identification, the variations in biometric characteristics acquired are compared with variations in reference biometric characteristics in order to authenticate or identify the user.

When this type of method is executed by a terminal of the smartphone type, the illumination is generally produced by the terminal itself and in particular by a screen of the smartphone, which facilitates generation of variable illumination. It should be noted however that a terminal screen generates a low-power illumination. When the facial recognition method is launched in a highly illuminated environment, for example in sunlight, the variations in illumination produced by the terminal are difficult for the image sensor of the terminal to perceive. The performances of the facial recognition method are then greatly reduced thereby. These methods then have a high error rate (i.e. negative authentication of a valid user, positive authentication of a non-valid user).

It is desirable to overcome these drawbacks of the prior art. It is in particular desirable to propose a method making it possible in particular to avoid positively authenticating a user who should not be authenticated.

DISCLOSURE OF THE INVENTION

According to a first aspect of the invention, the invention relates to an automatic face recognition method executed by a system comprising an image capture device and a light source able to illuminate a face positioned in front of said device, the automatic face recognition method comprising a recognition procedure comprising an acquisition of a plurality of images of a face, the light source producing a different illumination of the face at the time of each image acquisition, and an extraction of values representing the face from the plurality of images. The method further comprises: acquiring a first image of a face using said device; estimating a value, referred to as the estimated value, representing a signal to noise ratio of an image of said face illuminated solely by the light source, by multiplying a value representing a reference signal to noise ratio, referred to as the reference value, the reference value having been calculated from a value representing an image of said face illuminated solely by the light source obtained from a plurality of images of said face, referred to as the reference plurality, by a first term representing a ratio between a global luminance index of the face in a scene in which the face is situated when the first image is acquired and a global luminance index of the face in a scene in which the face was situated when the reference plurality was acquired, and by a second term representing a square of a ratio between a value representing a distance between the face and said device when the first image is acquired and a value representing a distance between the face and said device when the reference plurality is acquired; using the estimated value in order to determine whether or not the recognition procedure should be executed.

The use of the estimation of the signal to noise ratio makes it possible to determine when it is possible to execute the recognition procedure.

According to one embodiment, the value representing an image of said face illuminated solely by the light source is a difference between a second image of the face acquired with the light source switched off and a third image of the face acquired with the light source switched on.

According to one embodiment, each value representing a distance between the face and said device is an interocular distance on the face included in the image or the plurality of images corresponding to said value representing a distance between the face and said device.

The interocular distance is a value representing a distance between the face and the acquisition device that is relatively simple to obtain automatically from an image of a face.

According to one embodiment, each global luminance index is a result of multiplying an ISO sensitivity by an exposure time, by a value representing a grey level of the face in the image or in the plurality of images corresponding to said index, and by a square of an aperture of said device at the moment of acquisition of the image or of the plurality of images corresponding to said index, or of multiplying an inverse of a luminosity level in the vicinity of said device measured at the moment of acquisition of the image or of the plurality of images corresponding to said index by a value representing a grey level in the image or the plurality of images corresponding to said index.

According to one embodiment, the method further comprises:

determining that the recognition procedure can be executed when the estimated value is higher than a predetermined threshold value.

The estimated value of the signal to noise ratio gives an indication on the risk of the recognition procedure committing an authentication or identification error. Thus, when the risk of error is too great, the recognition procedure is not applied.

According to one embodiment, the method further comprises: acquiring a plurality of images of the face, referred to as the plurality acquired, using said device, each image in the plurality acquired being obtained with a different illumination of the face by the light source, and calculating a value, referred to as the real value, representing a signal to noise ratio in the images in the plurality acquired; comparing the real value and the estimated value; and determining that the recognition procedure can be executed when a value representing a difference between the real value and the estimated value is below a second predetermined threshold.

According to one embodiment, the plurality acquired comprises a fourth image of the face acquired with the light source switched off and a fifth image of the face acquired with the light source switched on.

According to a second aspect of the invention, the invention relates to an automatic face recognition system comprising an image capture device and a light source able to illuminate a face positioned in front of said device, the system comprising means for executing a recognition procedure comprising an acquisition of a plurality of images of a face, the light source producing a different illumination of the face at each acquisition of the image and an extraction of values representing the face from the plurality of images. The system further comprises: acquisition means for acquiring a first image of a face using said device; estimation means for estimating a value, referred to as the estimated value, representing a signal to noise ratio of an image of said face illuminated solely by the light source by multiplying a value representing a reference signal to noise ratio, referred to as the reference value, the reference value having been calculated from a value representing an image of said face illuminated solely by the light source obtained from a plurality of images of said face, referred to as the reference plurality, by a first term representing a ratio between a global luminance index of the face in a scene in which the face is situated when the first image is acquired and a global luminance index of the face in a scene in which the face was situated when the reference plurality was acquired, and by a second term representing a square of a ratio between a value representing a distance between the face and said device when the first image is acquired and a value representing a distance between the face and said device when the reference plurality is acquired; determination means using the estimated value in order to determine whether or not the recognition procedure should be executed.

According to a third aspect of the invention, the invention relates to a computer program comprising instructions for the implementation, by a device, of the method according to the first aspect, when said program is executed by a processor of said device.

According to a fourth aspect of the invention, the invention relates to storage means storing a computer program comprising instructions for the implementation, by a device, of the method according to the first aspect, when said program is executed by a processor of said device.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DISCLOSURE OF EMBODIMENTS

The invention is described hereinafter in a context wherein the terminal that is to execute a facial recognition method similar to the method described in the patent application FR 1661737 is a smartphone. Other terminals can however be envisaged, such as a tablet or a portable computer. The invention may also relate to fixed facial recognition systems, which are therefore assumed to be correctly oriented with respect to normal light sources of their environment, but which must all the same check whether a temporary light source is reducing the efficacy of the facial recognition method. Moreover, the invention is also suitable for any facial recognition method using variations in illumination of the face in order to obtain biometric characteristics, or for determining whether it is a true face or a fraud.

Figure 1:
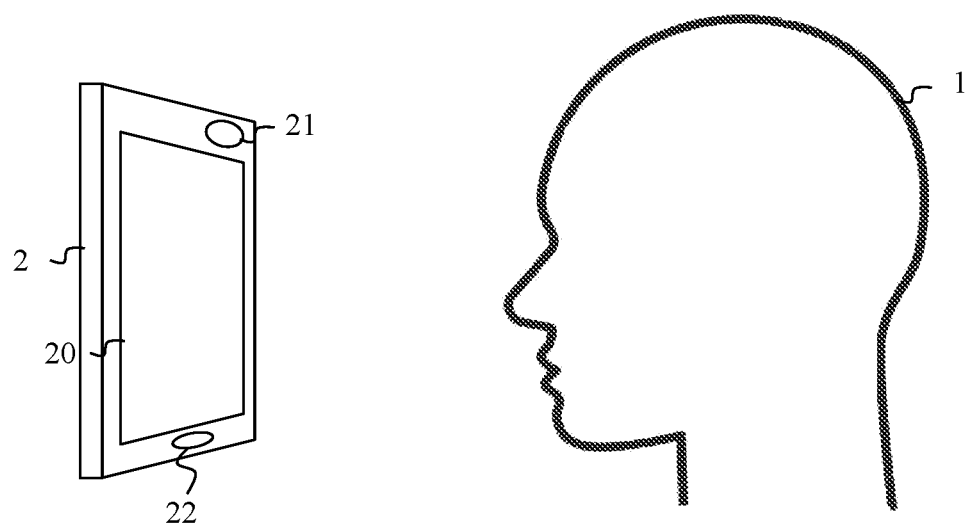
FIG. 1 illustrates schematically an example of implementation of the method according to the invention.

FIG. 1 illustrates schematically an example of implementation of the method according to the invention.

In FIG. 1, a user 1 faces a terminal 2 of the smartphone type. The terminal 2 comprises a screen 20, a front camera 21 and a control button 22. In this example, the user 1 must be authenticated by a facial recognition method in order to be able to use the terminal 2. The facial recognition method executed by the terminal 2 comprises for example the method described in the application FR 1661737. Hereinafter, this method is referred to as the "recognition procedure".

Figure 2:
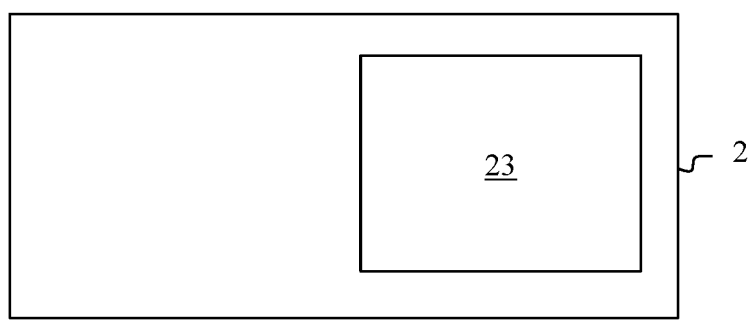
FIG. 2 illustrates schematically a terminal suitable for executing the method according to the invention.

FIG. 2 illustrates schematically a detail of the terminal 2.

The terminal 2 comprises a processing module 23 able to execute the facial recognition method according to the invention.

Figure 3:
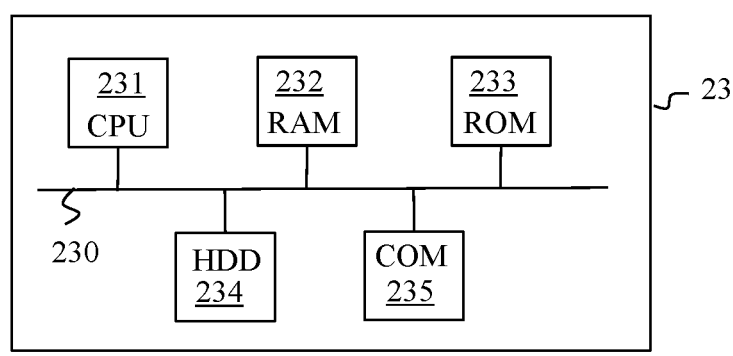
FIG. 3 illustrates schematically an example of hardware architecture of a processing module used for executing the invention.

FIG. 3 illustrates schematically an example of hardware architecture of the processing module 23.

According to the example of hardware architecture depicted in FIG. 3, the processing module 23 then comprises, connected by a communication bus 230: a processor or CPU (central processing unit) 231; a random access memory RAM 232; a read only memory ROM 233; a storage unit such as a hard disk or a storage medium reader such as an SD (Secure Digital) card reader 234; at least one communication interface 235. The communication interface 235 enables the processing module 23 to receive images from the front camera 21.

The processor 231 is capable of executing instructions loaded in the RAM 232 from the ROM 233, from an external memory (not shown), from a storage medium (such as an SD card), or from a communication network. When the processing module 23 is powered up, the processor 231 is capable of reading instructions from the RAM 232 and executing them. These instructions form a computer program causing the implementation, by the processor 231, of all or some of the methods described below in relation to FIGS. 4 and 5.

The methods described below in relation to FIGS. 4 and 5 can be implemented in software form by the execution of a set of instructions by a programmable machine, for example a DSP (digital signal processor), a microcontroller or a GPU (graphics processing unit), or be implemented in hardware form by a machine or a dedicated component, for example an FPGA (field-programmable gate array) or an ASIC (application-specific integrated circuit).

Figure 4:
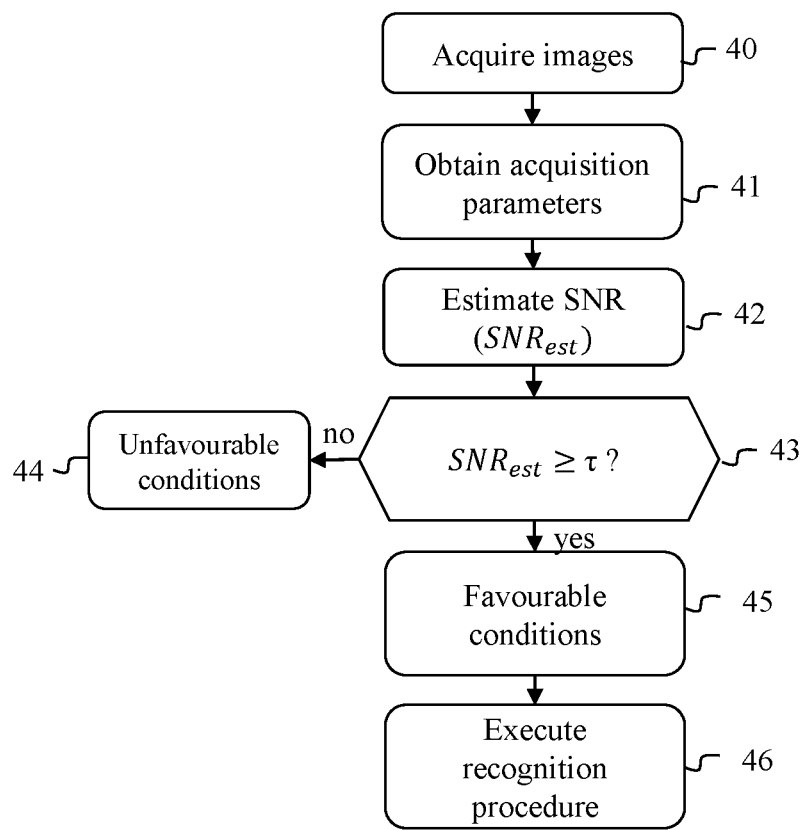
FIG. 4 illustrates schematically a first example of the method according to the invention.

FIG. 4 illustrates schematically a first example of a method according to the invention.

When the method in FIG. 4 is executed, the user 1 is facing the front camera 21. The screen 20 may be switched off or switched on.

The method described in relation to FIG. 4 begins with a step 40 during which the processing module 23 causes an acquisition of an image, referred to as the first image, by the camera 21.

In a step 41, the processing module 23 obtains acquisition parameters, referred to as current parameters, used by the front camera 21 when the first image is acquired.

In a step 42, the processing module 23 estimates a value $SNR_{Est}$, referred to as the estimated value, representing a signal to noise ratio (SNR) of an image of said face illuminated solely by the light source. To do this, the processing module uses a reference signal to noise ratio value, referred to as the reference value, $SNR_0$. In one embodiment, the reference value $SNR_0$ was calculated from a difference between a second image of the face of the user 1 acquired by the front camera 21 with the light source switched off (that is to say with the screen 20 switched off) and a third image of the face of the user 1 acquired by the front camera 21 with the light source switched on (that is to say with the screen 20 switched on). In this embodiment, the screen 20 is considered to be switched on when each colour component of the screen 20 is producing a maximum light intensity. The screen 20 is considered to be switched off when each colour component of the screen 20 is switched off. The acquisitions of the second and third images are very close in time so that the parameters of acquisition of the second and third images by the front cover 21 are considered to be identical.

In one embodiment, the reference value $SNR_0$ is calculated as follows:

$$SNR_0 = g_{x,y}\left(\frac{I_2(x, y) - I_3(x, y)}{I_3(x, y)}\right)$$

or as follows:

$$SNR_0 = \frac{g_{x,y}(I_2(x, y) - I_3(x, y))}{g_{x,y}(I_3(x, y))}$$

where $I_2(x,y)$ (and respectively $I_3(x,y)$) is a pixel value at a position (x,y) in the second image (and respectively in the third image), $g_{x,y}(i)$ calculates for example a mean (or a median value) of a variable i over all the possible pixel positions (x,y) in an image. The reference value $SNR_0$ therefore represents a ratio between a numerator representing a difference between the second and third images and a denominator representing the third image. It is considered that the numerator represents an image of a face illuminated solely by the screen 20 and that the denominator represents an image of the same face illuminated solely by ambient light (sunlight, ambient lighting, etc.).

In one embodiment, each image supplied by the front camera 21 is a grey-level image. In one embodiment, each image supplied by the front camera 21 is a colour image. In this case, the processing module 23 uses solely a luminance component of each colour image for calculating the signal to noise ratio values.

The second and third images were for example acquired during an enrolment phase at the time of a first use of the terminal 2 by the user 1 so that the user 1 can register on the terminal 2. The value $SNR_{Est}$ is estimated by the following equation:

$$SNR_{est} = f(Param_{Curr}, Param_0) \cdot SNR_0.$$

where $Param_{Curr}$ represents the current parameters, $Param_0$ represents parameters, referred to as reference parameters, of the front camera 21 at the time of acquisition of the second and third images, and $f(\ )$ is a function of the current parameters $Param_{Curr}$ and the reference parameters $Param_0$.

In one embodiment, the function $f(\ )$ is written as follows:

$$f(Param_{Curr}, Param_0) = \frac{ISO_{curr}}{ISO_0} \frac{itime_{curr}}{itime_0} \left(\frac{o_{curr}}{o_0}\right)^2 \frac{nvgvis_0}{nvgvis_{curr}} \left(\frac{IOD_{curr}}{IOD_0}\right)^2$$

where $ISO_{curr}$, $itime_{curr}$, $nvgvis_{curr}$ and $o_{curr}$ are current parameters and $ISO_0$, $itime_0$, $nvgvis_0$ and $o_0$ are reference parameters. The parameter $ISO_{curr}$ (and respectively $ISO_0$) represents an ISO sensitivity. The parameter $itime_{curr}$ (and respectively $itime_0$) represents an exposure time. The parameter $nvgvis_{curr}$ (and respectively $nvgvis_0$) represents a grey level of the face in the first image (and respectively in the second and/or third image). The parameter $o_{curr}$ (and respectively $o_0$) represents an aperture. The term $IOD_{curr}$ (and respectively $IOD_0$) represents an interocular distance (i.e. the distance between the eyes of the user 1). Each interocular distance is determined using a method for the automatic detection of the eyes in an image. For example, the method described in the document "Projection functions for Eye Detection, Zhi-Hua Zhou and Xin Geng, Pattern Recognition, Volume 37, Issue 5, May 2004, Pages 1049-1056" for determining a central point of the eyes is used. Once the position of the central point of each eye has been determined, the interocular distance is measured in number of pixels separating the two central points.

The function $f(\ )$ comprises a ratio between a first term $$\frac{ISO_{curr} \cdot itime_{curr} \cdot o_{curr}^2}{nvgvis_{curr}}$$

and a second term $$ISO_0 \cdot itime_0 \cdot o_0^2 \frac{ISO_0 \cdot itim_0 \cdot o_0^2}{nvgvis_0}.$$

The first term represents a global luminance index of the face in a scene in which the face is situated when the first image is acquired. The second term represents a global luminance index of the face in a scene in which the face was situated when the second and/or third image was acquired. The interocular distance $IOD_{curr}$ represents a distance between the camera 21 and the face of the user 1 when the first image is acquired. The interocular distance $IOD_0$ represents a distance between a camera 21 and the face of the user 1 when the second and/or third image is acquired.

In one embodiment, the sensitivity $ISO_0$ (or respectively the acquisition time $itime_0$, the grey level of the face $nvgvis_0$, the aperture $o_0$) is a mean between the ISO sensitivity (or respectively the acquisition time, the grey level of the face, the aperture) used when the second image is acquired and the ISO sensitivity (or respectively the acquisition time, the grey level of the face, the aperture) used when the third image is acquired. The interocular distance $IOD_0$ is a mean of the interocular distances measured in the second and third images.

In one embodiment, the camera 21 supplies the current and reference parameters to the processing module 23.

In a step 43, the processing module 23 compares the estimated value $SNR_{est}$ with a predetermined signal to noise ratio threshold T. The predetermined threshold $\tau$ was for example determined on a set of images representing faces acquired under variable illumination conditions. For example, the predetermined signal to noise ratio threshold $\tau$ is such that an image having a signal to noise ratio higher than the threshold $\tau$ has a probability of causing an error in the recognition procedure of less than a predetermined error rate A. For example, the predetermined error rate A is 1%. Thus, in the case of the use of images having a signal to noise ratio below the predetermined signal to noise ratio threshold $\tau$, the recognition procedure has at least a 1% chance of making a mistake in an identification or authentication.

When the estimated value $SNR_{est}$ is below the threshold $\tau$, the processing module 23, in a step 44, considers that the image acquisition conditions are unfavourable to an execution of the recognition procedure. In this case, the processing module 23 displays an error message on the screen of the terminal 2. For example, the error message invites the user 1 to move in order to effect his identification or authentication.

When the estimated value $SNR_{est}$ is above or equal to the threshold $\tau$, the processing module 23, in a step 45, considers that the image acquisition conditions are favourable to an execution of the recognition procedure. In this case, the processing module 23 initiates an execution of the recognition procedure in a step 46.

The method described in relation to FIG. 4 therefore avoids initiating the recognition procedure when the risk of error in this procedure is too high.

In one embodiment, the function $f(\ )$ is written as follows:

$$f(Param_{Curr}, Param_0) = \frac{lux_0}{lux_{curr}} \frac{nvg_0}{nvg_{curr}} \left(\frac{IOD_{curr}}{IOD_0}\right)^2$$

where $lux_0$ (and respectively $lux_{curr}$) is a luminosity level measured for example by a light meter when the second and/or third image is acquired (and respectively when the first image is acquired) and $nvg_0$ (and respectively $nvg_{curr}$) is a value representing a grey level of the face in the second and/or third image $nvgvis_0$ (and respectively in the first image $nvgvis_{curr}$) divided by a value representing a grey level in the entire second image and/or in the entire third image $nvgglob_0$ (and respectively in the first entire image $nvgglob_{curr}$).

$$nvg_{curr} = \frac{nvgvis_{curr}}{nvgglob_{curr}}$$

$$nvg_0 = \frac{nvgvis_0}{nvgglob_0}$$

In one embodiment, the luminosity level $lux_0$ is a mean of the luminosity levels measured when the second and third images are acquired. The grey level $nvgglob_0$ is a mean of the grey levels of the pixels of the second and third images. The grey level $nvgglob_{curr}$ is a mean of the grey levels of the pixels of the first image. The grey level $nvgvis_0$ is a mean of the grey levels of the pixels of the second and third images corresponding to the face. The grey level $nvgvis_{curr}$ is a mean of the grey levels of the pixels of the first image corresponding to the face. In one embodiment, the pixels corresponding to a face in an image are determined by an automatic face detection method such as the method described in the article "Robust Real-Time Face Detection, P. Viola, M. Jones, International Journal of Computer Vision 57(2), P. 137-154, 2004". When the images supplied by the camera 21 are colour images, the processing module 23 uses a mean of the pixel luminance component values of the images. The function $f(\ )$ comprises a ratio between a first term $$\frac{1}{lux_{curr}} \times nvg_{curr}$$

and a second term $$\frac{1}{lux_0} \times nvg_0.$$

The first term represents a global luminance index of the face in a scene in which the face is situated when the first image is acquired. The second term represents a global luminance index of the face in a scene in which the face was situated when the second and/or third images were acquired.

In one embodiment, the current and reference parameters are extracted from a file to the EXIF format (exchangeable image file format) associated with each image.

In one embodiment, other values representing the distance between the camera 21 and the face of the user 1 can be used. For example, the distance between the camera 21 and the face of the user 1 can be measured by a telemeter.

In one embodiment, the reference value $SNR_0$ can be determined from a plurality of pairs of second (i.e. screen 20 switched of) and third images (i.e. screen 20 switched on). In this case, an SNR value is calculated for each pair of second and third images and the reference value $SNR_0$ is a mean or a median value of the calculated SNR values.

In one embodiment, the reference value $SNR_0$ can be determined from a plurality of second images (i.e. screen 20 switched off) and a plurality of third images (i.e. screen 20 switched on). In this case, a second mean image is calculated from the plurality of second images and a third mean image is calculated from the plurality of third images.

In one embodiment, a second image is an image acquired with at least one of the colour components of the switched-off screen 20.

In one embodiment, a third image is an image acquired with at least one colour component of the screen 20 producing a non-zero light intensity.

It should be noted that, in all cases, the illumination produced by the screen 20 for a second image is different from the illumination produced by the screen 20 for each third image.

Up until now, we have considered that the screen 20 fulfilled a role of light source in the method described in relation to FIG. 4. In one embodiment, the method could just as well use an independent light source controlled by the processing module 23.

Figure 5:
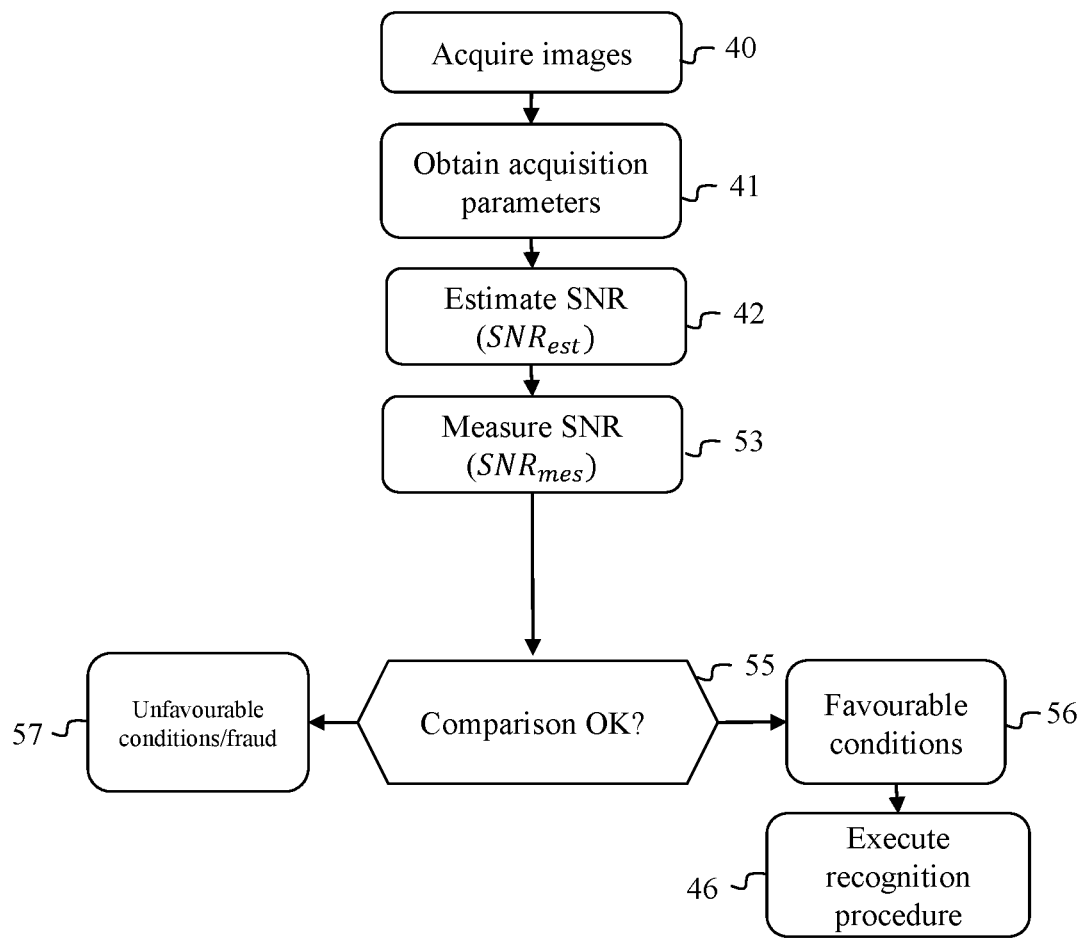
FIG. 5 illustrates schematically a second example of the method according to the invention.

FIG. 5 illustrates schematically a second example of a method according to the invention.

The method of FIG. 5 begins with steps 40, 41 and 42 already explained in relation to FIG. 4.

Step 42 is followed by a step 53, during which the processing module 23 measures a real signal to noise ratio value, referred to as real value, $SNR_r$. To do this, the processing module 23 initiates an acquisition of a fourth image of the face using the camera 21 with the screen 20 switched off and of a fifth image of the face using the camera 21 with the screen 20 switched on. From the fourth and fifth images, the processing module 23 calculates the real value in the same way that the reference value $SNR_0$ was calculated.

In a step 55, the processing module 23 compares the real value $SNR_r$ with the estimated value $SNR_{Est}$. When a value R representing a difference between the real value $SNR_r$ and the estimated value $SNR_{Est}$ is greater than a predetermined threshold Q, referred to as the divergence threshold, the processing module 23 considers that the face that is facing the camera 21 is reacting abnormally to the illumination by the screen 20. At least two reasons may explain why a face is reacting abnormally to the illumination by the screen 20:
  the illumination conditions of the scene in which the face is situated may be unfavourable to an image acquisition. For example, the face is over-exposed or in sunlight;
  an attempt at fraud is under way. The face placed in front of the camera is for example a photograph of a face that is printed or displayed on a screen of a terminal or a volume representation of a person (i.e. a mannequin).

In both cases, it is preferable not to execute the recognition procedure. Consequently, when the value R representing the difference between the real value $SNR_r$ and the estimated value $SNR_{Est}$ is above the divergence threshold Q, the processing module 23, in a step 57, decides not to execute the recognition procedure and to display, for example, an error message on the screen 20.

When the value R representing the difference between the real value $SNR_r$ and the estimated value $SNR_{Est}$ is below or equal to the divergence threshold Q, the processing module 23, in a step 56, determines that nothing opposes an execution of the recognition procedure. Step 56 is followed by step 46, already explained, during which the processing module 23 initiates the execution of the recognition procedure.

In one embodiment, the value R representing the difference between the real value $SNR_r$ and the estimated value $SNR_{Est}$ is calculated by the processing module 23 as follows:

$$R = \left| \log\left( \frac{SNR_r}{SNR_{Est}} \right) \right|$$

In one embodiment, the real value $SNR_r$ can be determined from a plurality of pairs of fourth (i.e. screen 20 switched off) and fifth images (i.e. screen 20 switched on). In this case, an SNR value is calculated for each pair of fourth and fifth images and the real value $SNR_r$ is a mean or a median value of the calculated SNR values.

In one embodiment, the real value $SNR_r$ can be determined from a plurality of fourth images (i.e. screen 20 switched off) and a plurality of fifth images (i.e. screen 20 switched on). In this case, a mean fourth image is calculated from the plurality of fourth images and a mean fifth image is calculated from the plurality of fifth images.

In one embodiment, a fourth image is an image acquired with at least one of the colour components of the screen 20 switched off.

In one embodiment, a fifth image is an image acquired with at least one colour component of the screen 20 producing a non-zero light intensity.

It should be noted that, in all cases, the illumination produced by the screen 20 for a fourth image is different from the illumination produced by the screen 20 for each fifth image.

The divergence threshold Ω was obtained by means of a set of training images. The set of training images comprises images of different types: images of real faces acquired under favourable illumination conditions, images of real faces acquired under unfavourable illumination conditions, photographic images of a face printed or displayed on a screen of a terminal and mannequin images.

For each type of image in the set of images, values R, each representing a difference between a real value $SNR_r$ and an estimated value $SNR_{Est}$, are calculated. The divergence threshold Ω is determined so as to distinguish the values R calculated using real images acquired under favourable illumination conditions from the values R calculated using other types of image.

It should be noted that the methods described in FIGS. 4 and 5 could be combined. Thus, when in step 43 the estimated value $SNR_{est}$ is greater than or equal to the predetermined signal to noise ratio threshold T, step 43 could be followed by step 53. In this case, it will be necessary to fulfil the condition of step 43 and the condition of step 45 in order to be able to execute the recognition procedure.

The invention claimed is:
1. An automatic face recognition method executed by a system comprising an image capture device and a light source able to illuminate a face positioned in front of said device, the automatic face recognition method comprising a recognition procedure comprising an acquisition of a plurality of images of a face, the light source producing a different illumination of the face at each image acquisition, and an extraction of values representing the face from the plurality of images, wherein the method further comprises:
  acquiring a first image of a face using said device;
  estimating a value, referred to as the estimated value, representing a signal to noise ratio of an image of said face illuminated solely by the light source, by multiplying a value representing a reference signal to noise ratio, referred to as the reference value, the reference value having been calculated from a value representing an image of said face illuminated solely by the light source obtained from a plurality of images of said face, referred to as the reference plurality, by a first term representing a ratio between a global luminance index of the face in a scene in which the face is situated when the first image is acquired and a global luminance index of the face in a scene in which the face was situated when the reference plurality was acquired, and by a second term representing a square of a ratio between a value representing a distance between the face and said device when the first image is acquired and a value representing a distance between the face and said device when the reference plurality is acquired;
  using the estimated value in order to determine whether or not the recognition procedure should be executed.

2. The method according to claim 1, wherein the value representing an image of said face illuminated solely by the light source is a difference between a second image of the face acquired with the light source switched off and a third image of the face acquired with the light source switched on.

3. The method according to claim 1, wherein each value representing a distance between the face and said device is an interocular distance on the face included in the image or the plurality of images corresponding to said value representing a distance between the face and said device.

4. The method according to claim 1, wherein each global luminance index is a result of multiplying an ISO sensitivity by an exposure time and by a square of an aperture of said device at the moment of acquisition of the image or of the plurality of images corresponding to said index, or of multiplying an inverse of a luminosity level in the vicinity of said device measured at the moment of acquisition of the image or of the plurality of images corresponding to said index by a value representing a grey level in the image or the plurality of images corresponding to said index.

5. The method according to claim 1, wherein the method further comprises: determining that the recognition procedure can be executed when the estimated value is higher than a predetermined threshold value.

6. The method according to claim 1, wherein the method further comprises:
   acquiring a plurality of images of the face, referred to as the plurality acquired, using said device, each image in the plurality acquired being obtained with a different illumination of the face by the light source, and calculating a value, referred to as the real value, representing a signal to noise ratio in the images in the plurality acquired;
   comparing the real value and the estimated value; and
   determining that the recognition procedure can be executed when a value representing a difference between the real value and the estimated value is below a second predetermined threshold.

7. The method according to claim 6, wherein the plurality acquired comprises a fourth image of the face acquired with the light source switched off and a fifth image of the face acquired with the light source switched on.

8. An automatic face recognition system comprising an image capture device and a light source able to illuminate a face positioned in front of said device, the system comprising means for executing a recognition procedure comprising an acquisition of a plurality of images of a face, the light source producing a different illumination of the face at each image acquisition and an extraction of values representing the face from the plurality of images, wherein the system comprises at least circuitry configured to:
   acquire a first image of a face using said device;
   estimate a value, referred to as the estimated value, representing a signal to noise ratio of an image of said face illuminated solely by the light source by multiplying a value representing a reference signal to noise ratio, referred to as the reference value, the reference value having been calculated from a value representing an image of said face illuminated solely by the light source obtained from a plurality of images of said face, referred to as the reference plurality, by a first term representing a ratio between a global luminance index of the face in a scene in which the face is situated when the first image is acquired and a global luminance index of the face in a scene in which the face was situated when the reference plurality was acquired, and by a second term representing a square of a ratio between a value representing a distance between the face and said device when the first image is acquired and a value representing a distance between the face and said device when the reference plurality is acquired;
   use the estimated value in order to determine whether or not the recognition procedure should be executed.

9. A computer program comprising instructions for the implementation, by a device, of the method according to claim 1, when said program is executed by a processor of said device.

10. A non-transitory storage medium storing a computer program comprising instructions for the implementation, by a device, of the method according to claim 1, when said program is executed by a processor of said device.

* * * * *